United States Patent Office 3,191,255
Patented June 29, 1965

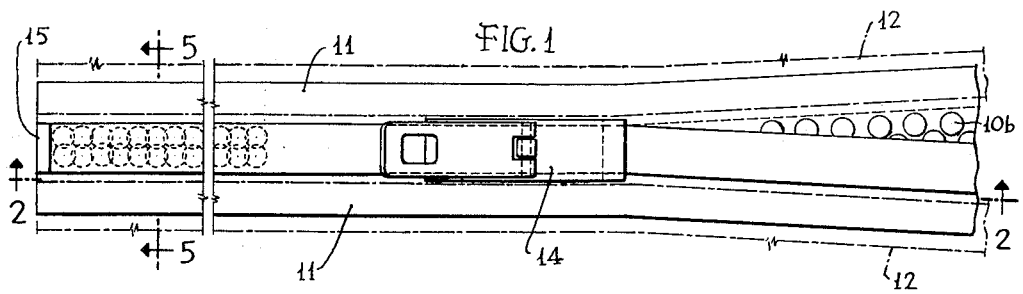
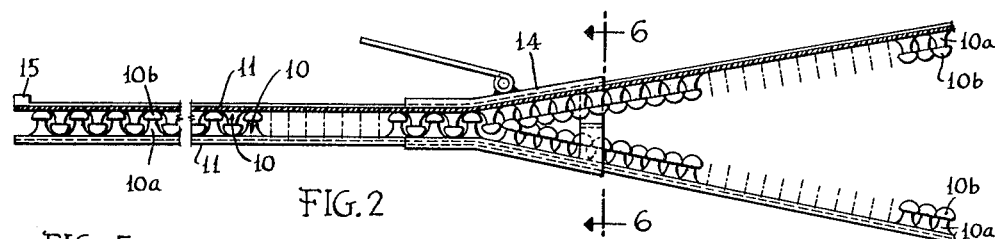
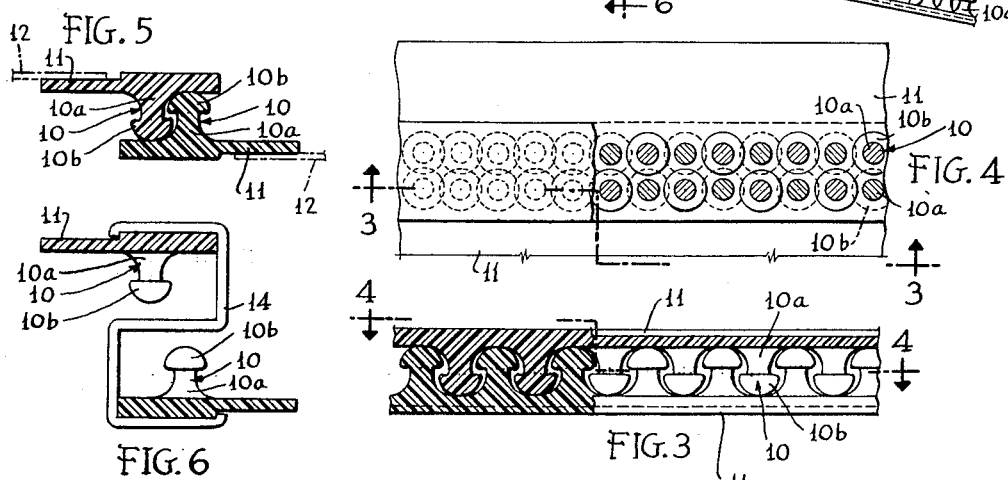
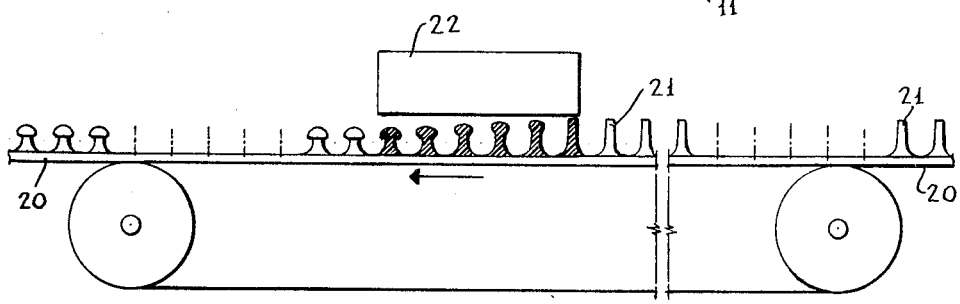

3,191,255
PLASTIC ZIPPER
Raymond N. Nealis, 11 Harvest Road, Levittown, Pa.
Continuation of application Ser. No. 847,841, Oct. 21, 1959. This application Aug. 13, 1962, Ser. No. 216,613
1 Claim. (Cl. 24—205.12)

This application is a continuation of my application Serial No. 847,841, filed October 21, 1959, and now abandoned.

This invention relates to separable interlocking fasteners and method of making them and has for an object the provision of improvements in this art.

One of the particular objects of the invention is to provide fasteners of simple form which can be easily and inexpensively produced.

Another object is to provide fastener elements which are arranged in staggered relation in adjacent rows so that each element (except at ends) is engaged with three adjacent elements whereby both lateral and axial displacement are strongly resisted.

Another object is to provide elements which are elastic in their heads, and flexible in their shanks and in their supports so that they may be readily engaged, by hand or by slider, and if by hand, starting at any point along the length of a strip, and which will strongly resist separation after being secured together.

Another object is to provide interlocked rows of elements with their shanks normal to the planes of pull tending to separate the elements so that the staggered elements of adjacent rows fully and completely resist separation laterally in the planes of pulling forces, the elements being engaged and disengaged by movement normal to the planes of the pulling forces.

Another object is the provide a simple and inexpensive method of forming the fasteners.

The above and other objects and advantages of the invention will be understood from the following description of certain exemplary embodiments of the invention, reference being made to the accompanying drawings, wherein:

FIG. 1 is a top plan view of mating strips of fasteners embodying the invention, the strips here being engaged by a slider;

FIG. 2 is a side view and section taken on the line 2—2 of FIG. 1;

FIG. 3 is an enlarged view of a portion of FIG. 2, showing the elements engaged, the section being shown on the line 3—3 of FIG. 4;

FIG. 4 is a section taken on the line 4—4 of FIG. 3;

FIG. 5 is an enlarged transverse section taken on the line 5—5 of FIG. 1;

FIG. 6 is a transverse section taken on the line 6—6 of FIG. 2; and

FIG. 7 is a section showing how the heads of the elements are formed.

The fastener comprises interengaging elements 10 which are secured to and extend upward generally normal or perpendicular, from the plane of a flexible longitudinal support strip 11 which is secured to the edges 12 of the article on which the fastener is used.

Each element includes a stem 10a and a head 10b. The stem may be formed integrally with the support strip, especially when plastic material is used, as is preferable. Nylon, pyroxylin, polyethylene, rubber and other plastics are suitable. The stem is flexible and the head preferably is also as well as being elastic so as to be deformable during interengagement. The flexible support strip, preferably also is somewhat elastic so as to yield in any direction to aid in the interengagement of the elements. With such a flexible support it is feasible to use more rigid and non-elastic elements.

The heads of the elements are tapered on the outer end, shown as conical or convex, so as to wedge past each other and are shouldered on their under sides so as to retain their connection and resist separation. The interengaging conical and shouldered surfaces are circumferentially continuous around the shank so as to be interengageable on all sides.

The elements are arranged in two parallel rows on each support strip with the elements of the two rows staggered relative to each other. The spacing of the elements in each row is such that the stem or shank of a mating element will closely fit between the heads of adjacent elements and the head of the mating element will closely fit between the stems of two adjacent elements. The adjacent row are so spaced that the same relationship prevails, that is, the head of a mating element engages the stem of an element of the adjacent row and vice versa.

The head of each element (except, of course, the end element) thus engages under the head of three adjacent opposite elements and is strongly retained against axial (axial of the element stem) separation by the interengaging shoulders of the heads. Since the lateral forces are balanced by the three-point engagement there is no tendency for an element to move sidewise and work out in spite of the fact that the stems may be flexible.

On the other hand, the tapered heads can wedge into interengaging position by pushing adjacent opposed elements out of the way both longitudinally and transversely of the rows since the element stems and the support strips are flexible and the heads (in the preferred form) are elastic.

As shown herein, the support strips are arranged in or parallel to the plane of the edges of the article; that is, the lines of force tending to separate the elements lie in the planes of the support strips and normal to the axes of the stems of the elements. In this arrangement the opposed elements of adjacent rows directly block each other and the possibility of separation in the plane of the pull is practically negligible.

An important feature of the fastener is that operation by hand is very easy and interengagement may be started at any point along the length as well as at the ends. Bending of the support strips out of their normal planes and the cumulative yielding of the elements provides for this; yet when the support strips are in their active position and there is no local out-of-plane pull the retentive grip of the fastener is extremely strong.

For convenience a slider may be used. One is indicated at 14. The slider interiorly is generally Z-shaped to extend around the overlapping support strips.

Practically all of the known accessory arrangements of usual slide fasteners can readily be applied to the present fastener in fairly obvious ways. For example, one end can be permanently secured together by rivets or staples or can be adhesively joined where, for example, the end stop elements 15 can be enlarged and fused together by heat. Completely separable elements could be used if a permanent connection is not wanted here. Toward the other end the slider tab may lock when pushed down in known manner; or the ends may carry snap fasteners, hooks or the like to lock against separation when a slider is not used; or additionally, even when it is used.

The arrangement of elements longitudinally and transversely is symmetrical and strips of elements can be interengaged either in parallel or transverse orientation, but more importantly, the material may be made in sheets having many coordinate rows of elements and strips of elements cut off in either direction.

FIG. 7 illustrates a method of forming strips or sheets of elements. Here a sheet 20 of plastic material with integral projections 21 is subjected to heat at the ends of the elements and this causes the material at the ends of the projections to flow down and unite with the lower material to form the heads. It has been found that certain plastics react to this treatment to form heads of almost perfect desired shape having convex ends and nether shoulders.

It would be almost impossible to form the integral headed projections and backing strip by any known molding process because such a structure after formation could not be freed from the mold.

The heated iron 22 travels progressively along the sheet or the sheet is passed along beneath a heated iron. The size and shape of the heads can be varied by varying the heat of the iron, its length, its speed of travel, and the distance above the projections.

It is thus seen that the invention provides an improved interlocking-element fastener and an improved method of making it.

While one embodiment of the invention has been disclosed for purposes of illustration it is to be understood that there may be various embodiments and modifications within the general scope of the invention.

I claim:

A separable, interlocking zipper-type fastener unit comprising in combination:
 a pair of flexible support strips;
 means on each strip to secure the same to an article;
 on each strip, a pair of parallel, adjacent rows of flexible fastener elements having stems annular in cross section attached to and upstanding from the support strip, the elements having heads annular in cross section located on their outer ends and the heads being of greater diameter than the stems and having tapered outer surfaces and shouldered undersides and the heads, the stems and the strips all being integral; the elements of the adjacent rows being staggered in position and spaced apart at such a distance that when the strips are closed the head of each element on one strip, except the end elements, is located below the heads of and between the stems of three opposed elements on the other strip, said below and between location of the heads providing for engagement of heads and stems and the engagement preventing separation of the fasteners by lateral forces but permitting separation by forces operating to peel one strip away from the other; and
 slider mechanism mounted on the strips for movement along the strips to close the same together to effect said below and between location of heads, the slider mechanism having means partially surrounding and engaging each strip for holding the slider mechanism on the strips and for effecting said closure.

References Cited by the Examiner
UNITED STATES PATENTS

| | | | |
|---|---|---|---|
| 2,066,060 | 12/36 | Sipe | 24—205.13 |
| 2,242,794 | 5/41 | Puschner | 18—59 |
| 2,304,989 | 12/42 | Snowdon | 18—56 |
| 2,499,898 | 3/50 | Anderson | 24—205.13 |
| 2,715,254 | 8/55 | Tschappu | 24—205.12 |
| 2,880,488 | 4/59 | Macy | 24—205.12 |

FOREIGN PATENTS

| | | |
|---|---|---|
| 956,320 | 1/50 | France. |
| 1,037,455 | 9/53 | France. |
| 421,528 | 5/47 | Italy. |

DONLEY J. STOCKING, *Primary Examiner.*

ABRAHAM G. STONE, BERNARD A. GELAK,
*Examiners.*